[63.]
MATTHEW WARD.
Improvement in Pulleys.
No. 118,761.
Patented Sep. 5, 1871.
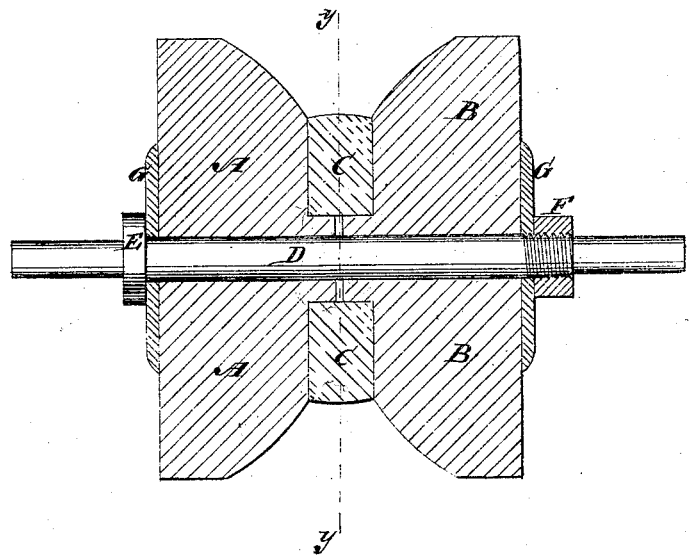
Fig. 2.
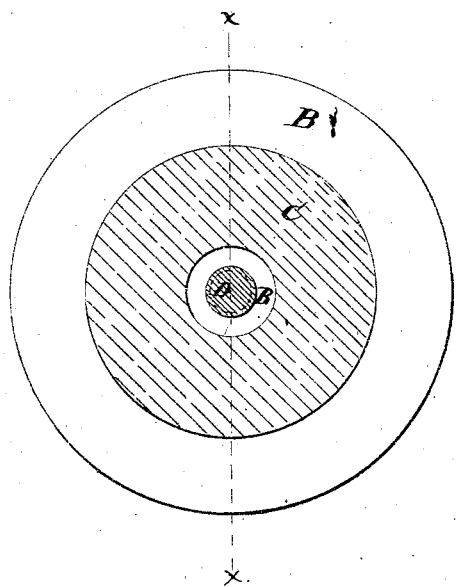
Witnesses:
E. Wolff
Francis McArdle
Inventor:
Matthew Ward.
per Munn & Co.
Attorneys.

UNITED STATES PATENT OFFICE.

MATTHEW WARD, OF MOUNT CARMEL, PENNSYLVANIA.

IMPROVEMENT IN PULLEYS.

Specification forming part of Letters Patent No. 118,761, dated September 5, 1871.

*To all whom it may concern:*

Be it known that I, MATTHEW WARD, of Mount Carmel, in the county of Northumberland and State of Pennsylvania, have invented a new and useful Improvement in Combined Gum-Elastic and Wood Pulley; and I do hereby declare that the following is a full, clear, and exact description thereof, which will enable others skilled in the art to make and use the same, reference being had to the accompanying drawing forming part of this specification, in which—

Figure 1 is a detail sectional view of my improved pulley taken through the line $x\,x$, Fig. 2. Fig. 2 is a detail sectional view of the same taken through the line $y\,y$, Fig. 1.

Similar letters of reference indicate corresponding parts.

My invention has for its object to furnish an improved pulley designed especially for carrying wire ropes upon inclined planes, and which shall be so constructed that it will begin to revolve as soon as the rope touches it, thus preventing the rope from cutting the wood, as it is liable to do with pulleys made of wood in the ordinary manner; and it consists in the construction of the various parts of the pulley as hereinafter more fully described.

The body of the pulley is made of wood and in two parts, A B, as shown in Fig. 1. The inner sides of the parts A B are turned down to form shoulders to receive the gum-elastic C and to prevent said gum-elastic from coming in contact with the pulley-shaft D. The outer edges of the inner sides of the parts A B are beveled or rounded off to form the flanges of the pulley. The gum-elastic C is made in the form of a flat ring, is placed between the parts A B of the pulley, and is secured in place by forcing the said parts A B toward each other, the shoulders of said parts being made narrower than the thickness of the said ring C. D is the shaft which passes through the parts A B of the pulley, and upon the ends of which are formed the journals of the pulley. Upon the shaft D, at one side of the pulley, is formed a collar, E, and upon said shaft, at the other side of the pulley, is formed a screw-thread, upon which is screwed a nut, F, so that the parts of the pulley may be secured to each other by screwing up the nut F. G G are metallic disks or washers, one of which is interposed between the collar E and the side of the adjacent part of the pulley, and the other is interposed between the side of the other part of the pulley and the nut F, as shown in Fig. 1.

Having thus described my invention, I claim as new and desire to secure by Letters Patent—

The pulley herein described, consisting of the wooden sections A B recessed upon their adjacent sides, the annular rubber disk C, clamping-plates G G, nut F, and collar E or its equivalent, all constructed and arranged as and for the purpose specified.

MATTHEW WARD.

Witnesses:
S. A. BERGSTRESSEL,
JOSEPH BLANCH.